(12) United States Patent
Jolly et al.

(10) Patent No.: US 6,854,573 B2
(45) Date of Patent: Feb. 15, 2005

(54) BRAKE WITH FIELD RESPONSIVE MATERIAL

(75) Inventors: Mark R. Jolly, Raleigh, NC (US); Robert H. Marjoram, Holly Springs, NC (US); Steve Koester, Cary, NC (US); Kenneth A. St. Clair, Cary, NC (US)

(73) Assignee: Lord Corporation, Cary, NC (US)

( * ) Notice: Subject to any disclaimer, the term of this patent is extended or adjusted under 35 U.S.C. 154(b) by 57 days.

(21) Appl. No.: 10/037,118

(22) Filed: Oct. 25, 2001

(65) Prior Publication Data

US 2003/0079948 A1 May 1, 2003

(51) Int. Cl.[7] .............................................. F16F 15/03
(52) U.S. Cl. .................. 188/267; 192/21.5; 188/267.2; 188/161
(58) Field of Search .................... 188/267, 267.2, 188/267.1, 161–165, 156–160, 268, 322.5, 290, 296; 192/21.5, 84.3, 84.4; 310/92, 268, 93, 261, 103, 77; 464/29; 267/140.15; 74/574; 482/903, 4, 111, 112, 5; 318/362, 254

(56) References Cited

U.S. PATENT DOCUMENTS

| | | | |
|---|---|---|---|
| 2,575,360 A | * | 11/1951 | Rabihow |
| 3,620,335 A | * | 11/1971 | Hendershot et al. ....... 192/21.5 |
| 3,672,476 A | * | 6/1972 | Hendershot |
| 3,680,671 A | * | 8/1972 | Hendershot et al. |
| 3,816,720 A | | 6/1974 | Linke |
| 4,350,913 A | | 9/1982 | Eddens |
| 4,811,823 A | * | 3/1989 | Raymond et al. ............ 188/267 |
| 4,967,887 A | | 11/1990 | Annacchino et al. ....... 192/21.5 |
| 5,007,513 A | | 4/1991 | Carlson |
| 5,180,145 A | | 1/1993 | Watanabe et al. |
| 5,598,908 A | | 2/1997 | York et al. |
| 5,842,547 A | | 12/1998 | Carlson et al. |
| 5,845,752 A | | 12/1998 | Gopalswamy et al. |
| 5,848,678 A | | 12/1998 | Johnston et al. |
| 6,117,093 A | | 9/2000 | Carlson ........................ 601/33 |
| 6,152,272 A | * | 11/2000 | Agnihotri et al. ......... 188/267.2 |
| 6,186,290 B1 | | 2/2001 | Carlson |
| 6,202,806 B1 | * | 3/2001 | Sandrin et al. ........... 188/267.1 |
| 6,302,249 B1 | * | 10/2001 | Jolly et al. ........................ 3/99 |
| 6,339,419 B1 | | 1/2002 | Jolly et al. |
| 6,340,080 B1 | | 1/2002 | Carlson ................... 188/267.2 |
| 6,373,465 B2 | | 4/2002 | Jolly et al. |
| 6,427,813 B1 | | 8/2002 | Carlson ................... 188/267.2 |
| 2003/0079948 A1 | | 5/2003 | Jolly et al. ................... 188/267 |

FOREIGN PATENT DOCUMENTS

WO    WO 03/036120 A2 *   5/2003

* cited by examiner

Primary Examiner—Douglas C. Butler
(74) Attorney, Agent, or Firm—Edward F. Murphy, III (57) ABSTRACT

A controllable brake includes a rotor supported on one shaft end. The rotor is housed within a chamber containing a field controllable material which is acted upon by a magnetic field generator to change the rheology of the material and thereby impede movement of the rotor. The shaft is supported by two bearings which, in combination with the housing define a second housing chamber adapted to enclose means for monitoring and/or controlling the brake and in this way, an integrated, compact controllable brake is provided.

1 Claim, 4 Drawing Sheets

BRAKE WITH FIELD RESPONSIVE MATERIAL

FIELD OF THE INVENTION

The invention relates to the area of brakes, clutches, resistance generating devices and motion control devices. Specifically the invention relates to devices employing a field responsive material for controlling torque in rotary acting devices or linearly-acting devices.

BACKGROUND OF THE INVENTION

Devices employing a field responsive material for damping and controlling vibration and shock are known. Such a field responsive material may comprise a suitable magnetorheological (MR) material well known to one skilled in the art. As the description proceeds, the field responsive material may be referred to as either "MR medium" or "MR material" or "field responsive material" or "field controllable material". Additionally, for purposes of clarity throughout this disclosure, devices employing such a field controllable material will generally be referred to as either "magnetorheological devices" or "MR devices" or "field controllable devices" or "field responsive devices". MR devices may be of the "rotary-acting" or "linear-acting" variety, and can provide variable controlled torques or forces. Known MR devices may include for example rotary brakes, rotary clutches and linear dampers.

Field controllable devices typically include a housing or chamber that contains a quantity of a magnetically controllable material, and a moveable member, such as a piston or rotor mounted for movement through the material in the housing. A magnetic field generator (a coil or permanent magnet) produces a magnetic field through one or more pole pieces for directing a magnetic flux through desired regions of the controllable material.

The field controllable material employed in MR devices is comprised of soft-magnetic or magnetizable particles dispersed within a carrier, frequently a liquid. While many current applications employ a liquid carrier, it also will be appreciated that the carrier may also comprise gaseous dispersions, for example as a powder. However the required carrier is dependent on the specific application for the MR device. Typical particles include carbonyl iron or stainless steel, and the like, having various shapes, but which are preferably spherical and have mean diameters of between about 0.1 $\mu$m to about 500 $\mu$m. The carrier materials may include hydraulic oils for example.

In operation, the field controllable material exhibits a rheology change, i.e., an increase in viscosity or resistance to shear, upon being exposed to a magnetic field. The greater the magnitude of the magnetic field passing through the field controllable material, the higher the shear stress or torque that can be achieved by the MR device. Such MR materials are readily commercially available in various formulations from Lord Corporation of Cary, N.C., and the selection of the particular MR material is typically determined by the desired application for the MR device.

MR devices, in particular MR brakes, are used whenever it is necessary to control motion, and in applications where it is desirable to control the velocity or energy dissipation in a dynamic system. This includes systems irrespective of whether the systems are driven by pneumatics, manually by an operator or by another motive force generating means. The specific application is controllable energy dissipation, in the rotary sense. Energy is removed from a dynamic system to give position and/or velocity control, or to generate a desired resistance torque.

Examples of such systems include drive-by-wire systems such as might be applied in a vehicle, fork lift, or the like. In such applications, it is desirable to maintain the function of traditional mechanical controls in a system controlled in a different manner. For example, a steering wheel may be used which implements a magnetic brake, but through the use of electronics provides signals to a motor such as a servo motor, to actuate the device to be controlled, such as steered wheels, flight control surfaces, etc. Depending on the position of the device as moved by the servo motors, it may be desirable to provide tactile feedback to the operator. Thus, when turning a wheel which incorporates an MR brake, position sensors and appropriate electronics may be implemented to provide torque feedback by actuating the field generator in the magnetic brake to affect the MR material and increase resistance to motion by a rotor in the brake. For example, such an application can be a steering wheel, to which it is attached, as to maintain a realistic "feel" for the operator, in a manner duplicating the tactile feedback of purely mechanical systems.

Often, the space allotted for the use of these devices is limited and specific applications require that the devices be maintained as small as possible, while still providing sufficient resistance to the control device. It would be desirable to provide a compact, integrated device to accommodate space limitations in specific applications.

The foregoing illustrates design criteria known to exist in present field responsive devices. Thus it is apparent that it would be advantageous to provide an alternative directed to providing a field responsive device that addresses one or more of the criteria associated with present devices. Accordingly, a suitable alternative is provided including features more fully disclosed hereinafter.

SUMMARY OF THE INVENTION

In one aspect of the present invention, a controllable brake includes a rotor having first and second rotor surfaces, an outer periphery and at least one working portion proximate to or at the outer periphery. A shaft has the rotor connected at one end of the shaft in a manner to restrain relative rotation therebetween. A housing includes a first chamber housing the rotor therein in a manner to allow rotation thereof (rotatably housing), and including a magnetic field generator spaced from the rotor, and configured and positioned for conveying a magnetic flux extending through controllable material between the field generator and working portion, in a direction toward the at least one working portion of the rotor. The controllable material is contained within the first chamber in contact with the at least one working portion of the rotor. Electronics are provided for controlling and/or monitoring operation of the brake. Such electronics may include sensors, power amplifiers, signal conditioners, analog or digital circuitry employing control algorithms, communications circuitry, as well as other like circuitry and/or optical, magnetic and like components as will be readily apparent to those of ordinary skill in the art. More specifically, the shaft may be supported by at least two bearings spaced from each other. The bearings are mounted on the housing in a manner to define a second housing chamber. The control electronics are housed in the second chamber. Typically, the second chamber is adjacent the first chamber.

For purposes of the description of the preferred embodiments of the invention, the term "working portion" refers to the portion of the rotor which, upon the application of a magnetic field, is engaged by the MR medium to impede movement of the rotor.

In another aspect of the invention, a controllable MR brake includes a rotor comprising first and second rotor surfaces, an outer periphery, and a working portion on at least one of the first and second rotor surfaces at a position proximate to the outer periphery. The rotor is fixed to a shaft at one shaft end and the rotor and the shaft are rotatable together. A housing includes a first chamber rotatably housing the rotor therein, and including a magnetic field generator spaced from the rotor and configured and positioned for conveying a magnetic flux acting on a volume of controllable material located in the first housing chamber in contact with at least one surface proximate the outer periphery. The controllable material is contained within the first chamber to be in contact with at least the working portion of the rotor. Electronics serve to control and monitor operation of the brake. In a more specific aspect, a second chamber is included in the housing and houses the electronics therein to provide a compact and integrated MR brake with electronics housed therein.

The magnetic field generator may be an electromagnetic coil, with poles positioned for conveying a flux extending through the field controllable material at least on one side of the rotor, with the rotor configured as a disk. Alternatively, the magnetic field generator can be an electromagnetic coil with poles positioned on both sides of the rotor on the working surfaces thereof for conveying flux extending on both sides, with the rotor also being configured as a disk.

In specific applications, the shaft for the rotor is supported for rotation by two bearings in the housing, which allow for a second chamber to house electronics, and seals are provided around the shaft at the point of entry into the first chamber for sealing the first chamber to prevent the migration of the controllable material from the first chamber to the second chamber.

In another more specific aspect of the invention, a return-to-center device such as a torsional spring or like device may be provided to urge the rotor to return to a relative center position.

Yet still further, the connection between the shaft and the rotor may be arranged so as to allow some backlash between the rotor and the shaft, and the control electronics can be arranged for detecting movement of the shaft and for causing the magnetic field generator to reduce magnetic field in response to the shaft movement to allow easy movement of the control device connected to the brake, such as a steering wheel, back from an end-of-movement position.

In an alternative configuration, the rotor can be configured to have a working portion on the outer periphery and on the rotor surfaces at a portion proximate the outer periphery. The magnetic field generator which is spaced from the rotor can be configured for conveying a magnetic flux extending through controllable material in directions both, (1) parallel to the shaft and perpendicular to the working portion proximate the outer periphery and (2) perpendicular to the shaft and to the outer periphery of the rotor. This can be done by configuring, for example, the magnetic field generator as an electromagnetic coil with one pole adjacent the working portion on one surface of the rotor, and the other pole extending outside of the outer periphery, and at least co-extensive with the outer periphery of the rotor.

In yet still a further aspect, the rotor can be configured as having first and second rotor surfaces and an outer periphery. The outer periphery is shaped such that the working portion of the rotor faces radially outward from the rotor and the shaft and has sufficient working surface as to allow a magnetic field to induce sufficient shear stress within the controllable material acting on the working surface to inhibit or prevent motion of the rotor. Such a rotor configuration can include a drum-like configuration in which the outer periphery is shaped fairly wide relative to the actual thickness of the rest of the rotor. In this manner, the magnetic field generator is configured to generate a magnetic field which acts on the controllable material adjacent and in contact with the working portion.

In such a configuration, the walls of the chamber in which the rotor is housed can be tapered. The taper can be an amount sufficient to enhance migration of field controllable material away from the shaft and toward the working surface of the rotor. In addition, other alternative structures can be built into the rotor proximate the shaft, the housing, and/or on the shaft itself as to create a tortuous path for the field controllable material, making it difficult to have it migrate towards the shaft and in the direction of seals associated with the shaft to retain the material within the chamber housing the rotor. The seals used can be conventional seals and/or of other configurations as will be readily apparent to those of ordinary skill in the art, such as "v-seals" of conventional construction. Similarly, conventional bearings, such as roller elements or bearings, can be used in supporting the shafts as well as other types of bearings which are well known to those of ordinary skill in the art, interchangeable therewith, including, without limitation, dry shaft bearings and the like.

The foregoing and other aspects will become apparent from the following detailed description of the invention when considered in conjunction with the accompanying drawing figures.

BRIEF DESCRIPTION OF THE DRAWINGS

The accompanying drawings, which form a part of this specification, illustrate several key embodiments of the present invention. The drawings and description together serve to fully explain the invention.

DETAILED DESCRIPTION OF PREFERRED EMBODIMENTS

Figure 1:
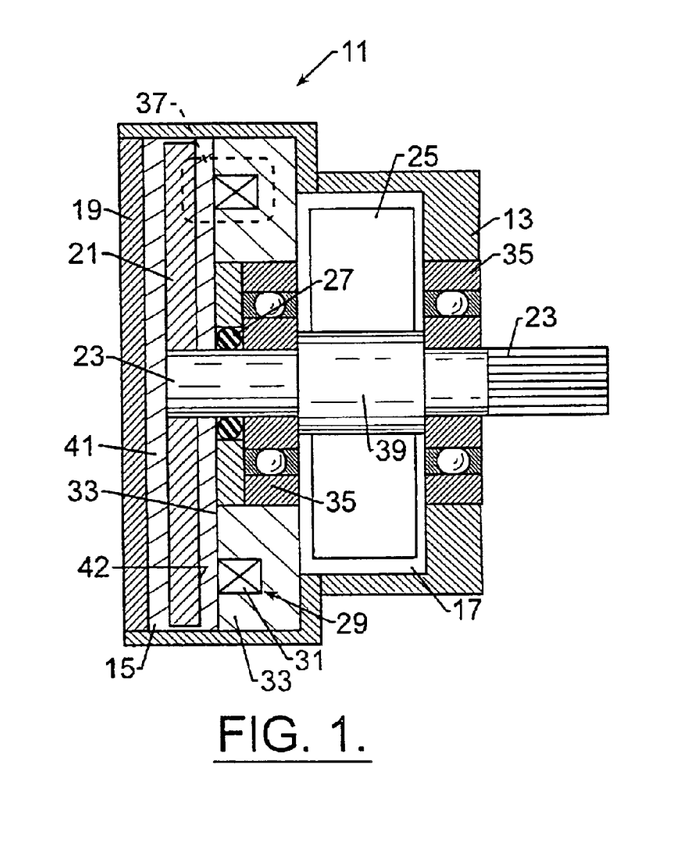
FIG. 1 is a longitudinal sectional view of a MR device having side coils mounted therein, and having electronics integrated into the brake.

Now turning to the Figures wherein like parts are referred to by the same numbers in the several views, FIG. 1 illustrates a first embodiment of the present invention. The brake 11 illustrated in FIG. 1 is a side coil brake. As the description proceeds it should be understood that although the term "brake" is used to describe the embodiments of the invention is generally a torque generating device that creates a dissipative torque in response to signals received or generated by the device 11. For purposes of describing the preferred embodiments of the invention the field controllable material is disclosed as a free flowing material with particles randomly dispersed throughout the carrier medium. However, it is contemplated that the field controllable medium may also be comprised of a compacted material where the particles are fixed relative to adjacent particles.

Brake 11 includes a housing 13 having a first chamber 15 which houses rotor 21 for rotation therein. Optionally, a second housing chamber 17 is provided and the chamber may enclose any combination of control electronics and control devices comprising for example: sensors for obtaining the displacement or velocity of the rotor 21; an amplifier for increasing the low current signal sent to the field generator 31; controls for communicating with a vehicle operator or a third party located away from the brake, and a communication means for facilitating such external communication. Such control electronics and control devices are represented schematically in FIG. 1 and are identified as 25. The control electronics are used to monitor and/or control operation of device 11. The present invention brake permits control electronics and devices to be located in the brake housing rather than at locations external to the brake. This provides for a compact brake package and it is believed by locating the sensitive control electronics and control devices internally, the electronics and devices are better protected from dirt and particulate matter than with current devices which require the sensitive electronics to be located external of the device housing. As the description proceeds the components located in the second housing chamber may be described generally as "electronics" or "control electronics" for example, however it should be understood that this term should not be limiting and the inventors do not wish to be limited to only electronic type devices. Rather the term referring to the devices and components housed in the second chamber shall more generally be defined and comprised of any suitable means for controlling and or monitoring operation of the device and such means may be comprised of electronic devices and/or mechanical components.

For purposes of describing the first embodiment of the invention, rotor 21 is disk-shaped and is supported on a shaft 23 within the housing 13 for rotation within the housing chamber 15. The rotor includes first and second surfaces and an outer periphery. The surfaces include working portions near the outer periphery at regions on the surface of the rotor upon which the magnetic field acts. The working surface is identified at 42 in FIG. 1. A typical magnetic flux line 37 associated with the applied magnetic field is shown dashed in FIG. 1.

Brake housing 13 includes an open end where the first chamber 15 is located and the open housing end and the chamber is closed and sealed by closing plate 19. The first chamber also contains therein a volume of field controllable material 41 and electromagnetic field generators 29. The field generators comprise, for example, in one configuration, coil 31 and pole piece 33. When activated, the magnetic field generator 29 creates magnetic flux 37. In FIG. 1 the magnetic flux 37 is represented only on one side of the rotor. However the magnetic field acts toroidally around the longitudinal shaft axis and along the entire working surface 42 near the outer periphery of the rotor. The presence of the magnetic field causes the field responsive material 41 to change its rheology resulting in the development of a higher yield stress that must be exceeded to induce onset of shearing of the field responsive material. Typically, in the absence of a magnetic field, the particles return to an unorganized or freely dispersed state and the apparent viscosity or shear flow resistance of the overall material 41 is correspondingly reduced. By activating the magnetic field, the material 41 acts on the working portion 42 of the rotor 21 to inhibit its rotational movement. The stippling that represents material 41 schematically in FIG. 1 is shown in an organized manner in FIG. 1 and the organized arrangement of the particles is a result of the application of field 37. As may be appreciated, supporting the shaft for rotation are bearings 35 which are shown as ball bearings, but may be comprised of any suitable bearing adapted to support rotation of shaft 23.

To keep the field controllable material 41 within the first chamber 15, conventional seal 27 is provided to maintain the material 41 in chamber 15 between plate 19 and pole piece 33. The seal may comprise any suitable seal member adapted to prevent egress of the material from its required location in chamber 15.

The monitoring and controlling electronics and devices 25 housed within the second chamber 17 may include multiple parts such as a rotating disk which is positionally detected by a sensor fixed within the walls of the chamber 17. The sensor may or may not be in contact with the rotating shaft 23. Such a disk may be mounted along the shaft for example through an intermediary sleeve 39.

In brake configuration 11, the magnetic flux 37 generated is substantially perpendicular to surface 42 of the rotor 21, which in this embodiment is shown as a disk, and the magnetic flux is substantially parallel to the shaft 23 as the flux passes through the field controllable material.

In the first embodiment of the invention illustrated in FIG. 1, the disk or rotor 21 is supported by shaft 23 at one shaft end. By supporting the rotor 21 in this manner, a significant portion of the length of the shaft is available to effectively support other components and systems of brake 11. The bearings 35 are located along the shaft length and are spaced apart by an axial distance required to provide rotor stability. As a result of such bearing location and alignment and location, a chamber 17 is defined by the housing 13, bearings 35 and pole pieces 33 wherein various sensors, electronics and other systems may be housed. As a result, brake 11 represents a compact, integrated package generally comprising the required mechanical rotor 21 and shaft 23, field responsive material 41, field generator 29 and monitor and control electronics/sensors 25.

By locating the magnetic field generator 29 along one side of the rotor 21, additional combinations of rotor 21 and field generator 29 may be stacked against the rotor 21 shown in FIG. 1. Any number of additional rotors and field generators may be provided in order to provide the appropriate duplication of magnetic field generators 29 thereby resulting in a brake configuration with multiple disks, suitable for a desired application. Such a brake configuration having a plurality of disks and generators is not illustrated in FIG. 1. Such an alternate configuration would duplicate the FIG. 1 arrangement of rotor 21 and generator 29 in multiple iterations in the direction of end plate 19. Another advantage of first embodiment brake 11 is that by providing a plurality of rotors, the integrated package may be made smaller in the radial disk direction and thus may be more suitable for specific applications where smaller brake configurations are required.

Figure 2:
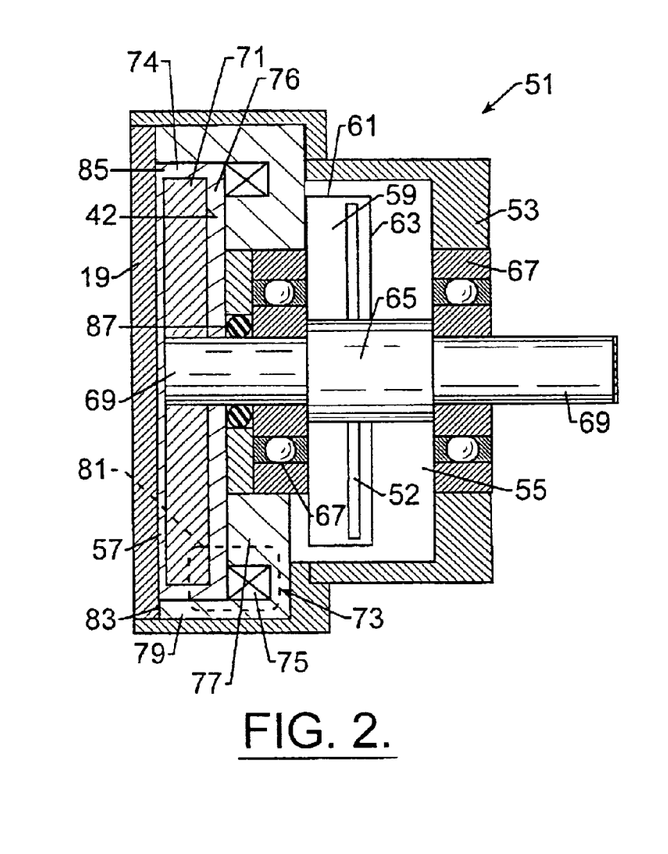
FIG. 2 is a longitudinal sectional view of an MR brake having wrap-around poles for conveying magnetic flux which acts on working surfaces on the periphery of the rotor as well as on a side surface thereof, and also including integrated electronics.

FIG. 2 illustrates a second embodiment of the present invention. The second embodiment magnetic brake 51 is comprised of many of the elements comprising brake 11 of FIG. 1. In this alternate embodiment, brake 51 comprises housing 53 which defines chamber 55 for housing integrated electronics/sensors 59 and also defines chamber 57 for housing rotor 71. Similar to the embodiment shown in FIG. 1, an end plate 19 is provided to close and seal the chamber 57. Although the plate is shown as substantially planar, the plate may also comprise portions that extend substantially perpendicular to the plate and wrap around the housing. Ball bearings 67 serve to support the shaft 69 and conventional seal 87 closes off the first chamber 57 to prevent the field responsive material 85 from migrating from within the chamber 57 toward the bearings 67 and out of the chamber 57. In this alternate embodiment, the rotor 71 is attached to an end of shaft 69 is engaged to the rotor 71 and is rotatable with the shaft. The rotor is not limited to a disk-shaped configuration as will become more readily apparent from the discussion that follows with reference to FIGS. 3 and 5.

As in the case with FIG. 1, a sleeve 65 can be mounted on the shaft 69 and the monitoring and controlling electronics/sensor 59 are shown schematically in greater detail as made up, for example, of two parts 61 and 63. A first part 61 may be fixed within the housing and not fixedly engaged to the sleeve 65. The first part 61 can include monitor and control electronics as well as sensors and/or detectors. Portion 63 can be, for example, a rotating disk 52 mounted on the sleeve 65, the rotation of which is detected by sensors mounted on the fixed part 61. Thus, the rotation of the shaft 69 and rotor 71 can be detected to allow appropriate control of electromagnetic field generator 73.

In the second embodiment brake 51, the electromagnetic field generator 73 may include an electromagnetic coil 75 and a pole piece configuration that is slightly different than the configuration of FIG. 1. Turning to FIG. 2, the pole configuration includes a first radially extending pole portion 77 and a second axially extending pole portion 79. The second pole portion extends axially between radially extending pole portion 77 and plate 19. Respective gaps 74 and 76 separate the outer periphery of the rotor 71 and the second pole portion 79 and the working surface 42 and the first pole portion 77. When a current is supplied to the coil 75, the field generator is activated and thereby generates magnetic flux 81, represented dashed in FIG. 2, which acts on field responsive material that fills the chamber 57 and gaps 74 and 76. The field 81 changes the rheology of the material causing the material to act upon the rotor outer periphery and surface 42 and thereby provide resistance to the motion of the rotor 71. Like brake 11 of FIG. 1, although a single rotor 71/generator 73 combination is shown in FIG. 2, brake 51 may comprise any suitable number of rotor/generator combinations required to supply the requisite braking forces. The benefits associated with the first embodiment brake recited hereinabove are also realized with the second embodiment brake 51.

Figure 3:
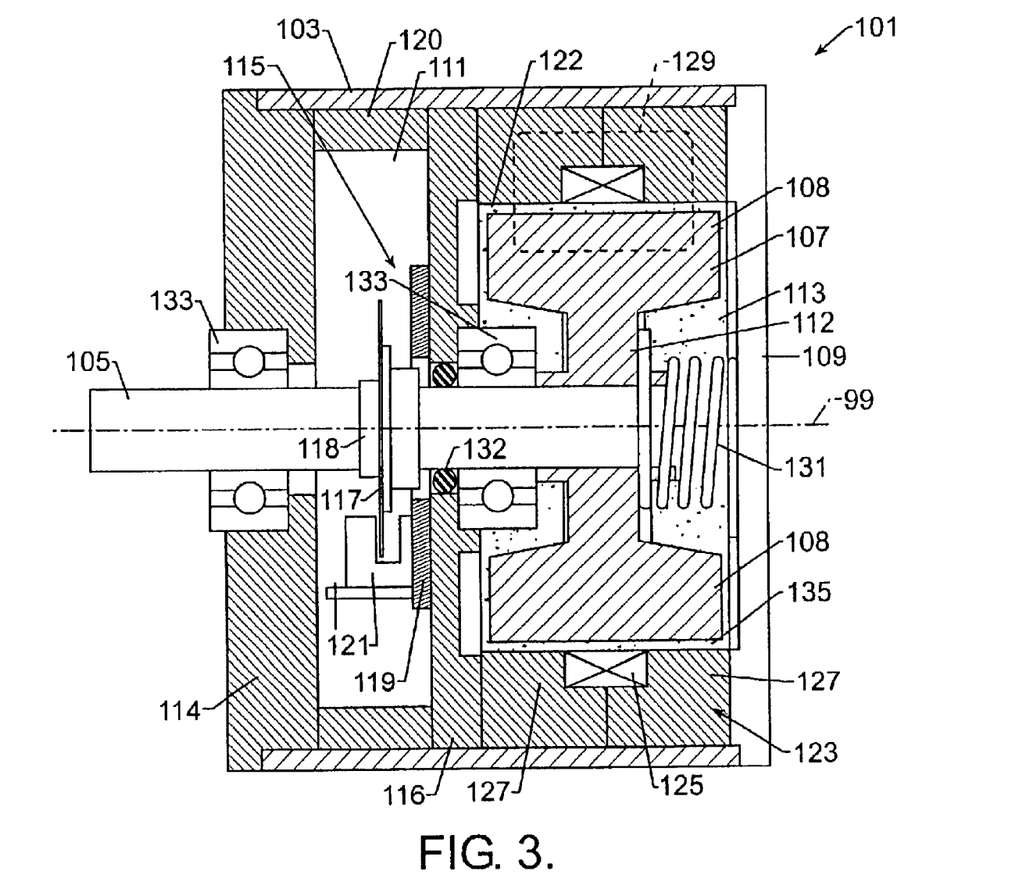
FIG. 3 is a longitudinal sectional view of a drum-style brake having the magnetic field generators positioned for acting on an enlarged outer periphery making up a working surface of the rotor, and comprising integrated electronics within a second chamber and a torsional return-to-center spring incorporated within the chamber housing the rotor.

A third embodiment brake of the present invention is illustrated in FIG. 3 and is referred to generally at 101. Brake 101 comprises hollow, cylindrical housing 103 which defines a first chamber 113 for housing a rotor 107 for rotation therein about axis 99 and defines second chamber 111 which houses monitoring and/or controlling electronics 115 in the manner previously described. The first chamber also houses a volume of a field responsive material 135. The rotor is a drum-shaped rotor that comprises a substantially I-shaped cross section with a wide outer annular peripheral portion 108 joined by a narrow web 112. The rotor 107 is fixed in a conventional manner to one end of shaft 105 which in turn is supported by bearings 133 along the shaft length and generally in the manner previously described with first and second embodiment brakes 11 and 51. Closing plate 109 serves to seal and close one end of the housing 103. Plate 114 closes and seals the opposite housing end. The rotor may have any suitable cross section and other suitable configurations may comprise a C-shaped cross section and an L-shaped cross section for example.

The monitor and/or control electronics 115, in exemplary form, can include a combination of rotating disks having appropriate notches or other detectable indicia thereon. The rotating disks 117 may be mounted on a sleeve 118 fixed to shaft 105. Other components 119 of the electronics 115 can be fixed within the chamber 111 in a manner so that the components surround the sleeve and are not in contact with the sleeve 118. In this way, the components 119 do not rotate with the sleeve 118. Sensors or brushes schematically represented at 121 may be mounted on member 119 to detect relative rotation of disk 117.

In the embodiment of FIG. 3, the seal 132 required to prevent migration of material 135 from the first chamber 113 to the second chamber 111 is shown seated in bearing support plate 116. Such a suitable seal may comprise the seal disclosed in the description of first and second embodiment brakes. The suitable conventional seal may be supported in the bearing support plate 116 or within bearings 133. An annular shroud 120 is located between plates 114 and 116. Shroud 120, in combination with plates 114 and 116 encloses the sensing means 115 within chamber 111.

Returning again to the rotor 107 of the third embodiment brake 101, rotor 107 is not substantially disk-shaped like disks 21 and 71 previously described. As shown in FIG. 3, rotor enlarged peripheral portion 108 is located proximate electromagnetic coil 125 of field generator generally identified at 123. As shown by the stippling representing field responsive material 135, an annular gap 122 separates the portion 108 and field generator and the gap 122 is substantially filled with a volume of the field controllable material 135. The magnetic field produced by field generator 123 extends through material 135 and the portion of the rotor identified at 108. The magnetic field is illustrated by magnetic field 129 represented as dashed in FIG. 3.

The magnetic field generator 123 generally comprises an electromagnetic coil 125 and pole pieces 127 which in combination generate an electromagnetic flux represented by dashed field lines 129 which extend through the material 135 in a direction that is substantially perpendicular to shaft 105 and to the periphery of the rotor 107. As shown in FIG. 3 the field generator is located radially outwardly from the rotor 107.

The third embodiment brake 101 comprises a return-to-center acting device, such as a torsion or torsional center-return spring 131 which is mounted within first housing chamber 113. Other center return devices may comprise bungee cords or other type elastic components. Generally the suitable center return device is any device that stores energy as the rotor and/or shaft are/is displaced from a center or start position or orientation and then at a particular displacement releases the stored energy to return the rotor and shaft to the start orientation. The particular displacement that results in a release of the stored energy may comprise for example, the operator releasing the shaft or rotor or the shaft or rotor reaching a maximum angular displacement. The torsion return spring 131 typically assumes a torque free condition at the center position of a device with which brake 101 may be associated, such as a steering wheel at the center position of the device. The return to center member is conventionally fixed at its ends to both the rotor 107, and end plate 109 so as to exert a progressively increasing return torque to center position upon the turning of the device with which the brake is associated, for example, a wheel. The return-to-center device may comprise a number of devices and attachment configurations.

Figure 4:
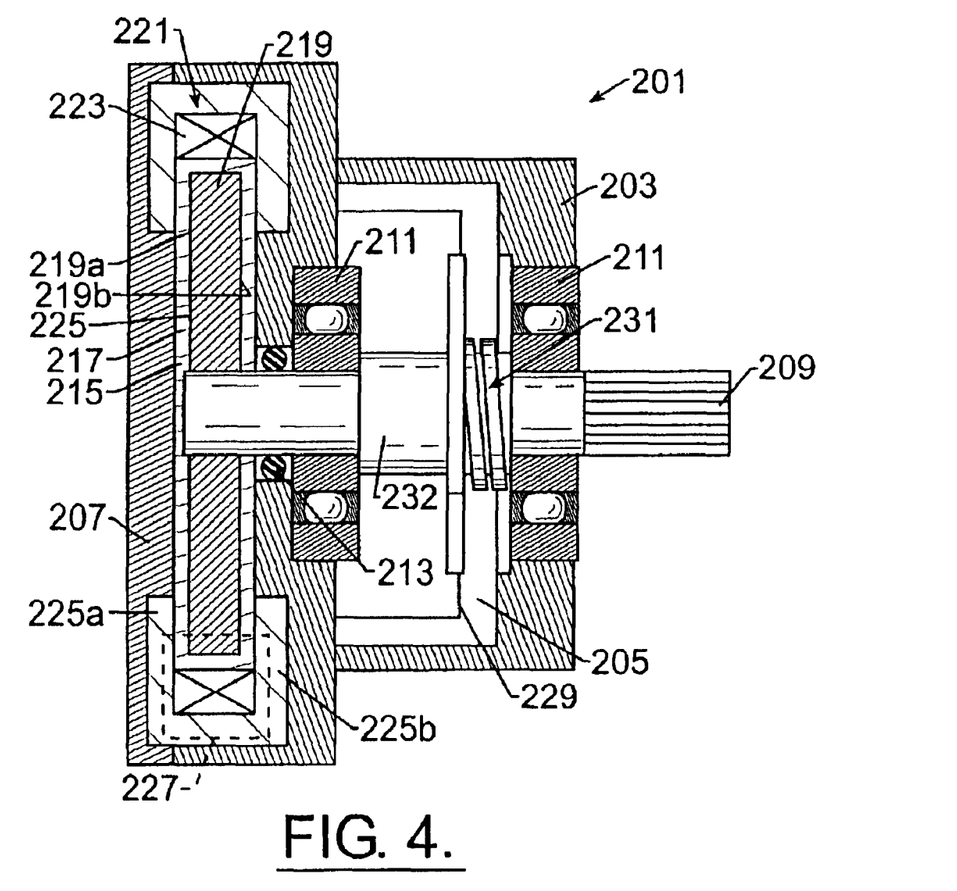
FIG. 4 is a longitudinal sectional view of a brake similar to that of FIG. 1, but showing the magnetic field generator configured for acting on both surfaces of the rotor, and also showing integrated electronics and how a return-to-center torsional spring can be incorporated within the housing for the electronics.

FIG. 4 illustrates a fourth embodiment brake 201 similar to the first embodiment brake 11. In the fourth embodiment brake, the brake housing 203 includes a first chamber 215 wherein rotor 219 is located for rotation therein and the rotor is fixed to one end of shaft 209. The chamber 215 includes a volume of a field responsive material 217 therein. Conventional seal 213 seals the chamber 215 by preventing the field controllable material from migrating out of the chamber 215. Plate 207 closes the chamber 215 after the brake 201 is fully assembled. Bearings 211 support shaft 209 away from the shaft end supporting the rotor 219. The housing 203 also defines a second chamber 205 for housing the monitoring and control electronics and devices. The control means is represented schematically and referenced at 229 in FIG. 4. A torsion return spring 231 may be provided within the second chamber 205, fixedly secured at the spring ends to an internal wall of the second chamber 205, and to a sleeve 232 upon which portions of the control means 229 may be also mounted for rotation therewith. The sleeve is made integral with the shaft 209 for rotation therewith.

In the embodiment of the invention illustrated FIG. 4, the magnetic field generator 221 comprises an annular pole piece 225 having a U-shaped cross section and an electromagnetic coil 223 located within the open portion of the pole piece and radially outwardly from and adjacent to the outer periphery of the disk-shaped rotor 219. The pole piece 225 could be comprised of separate pole pieces for ease of assembly and manufacture. As shown in FIG. 4, the legs or side portions of the poles 225a and 225b extend toward the central longitudinal axis of rotation of shaft 209 and adjacent the rotor working surfaces 219a and 219b. Gaps separate the pole piece legs 225a, 225b and electromagnet 223 from the rotor 219 and field controllable material 217 substantially fills the gaps. The magnetic flux line 227 represented as dashed in FIG. 4, causes the rheology of material 217 to change thereby producing a torque dissipating force that acts on the working surfaces 219a, 219b of the rotor 219 to impede rotation thereof.

Figure 5:
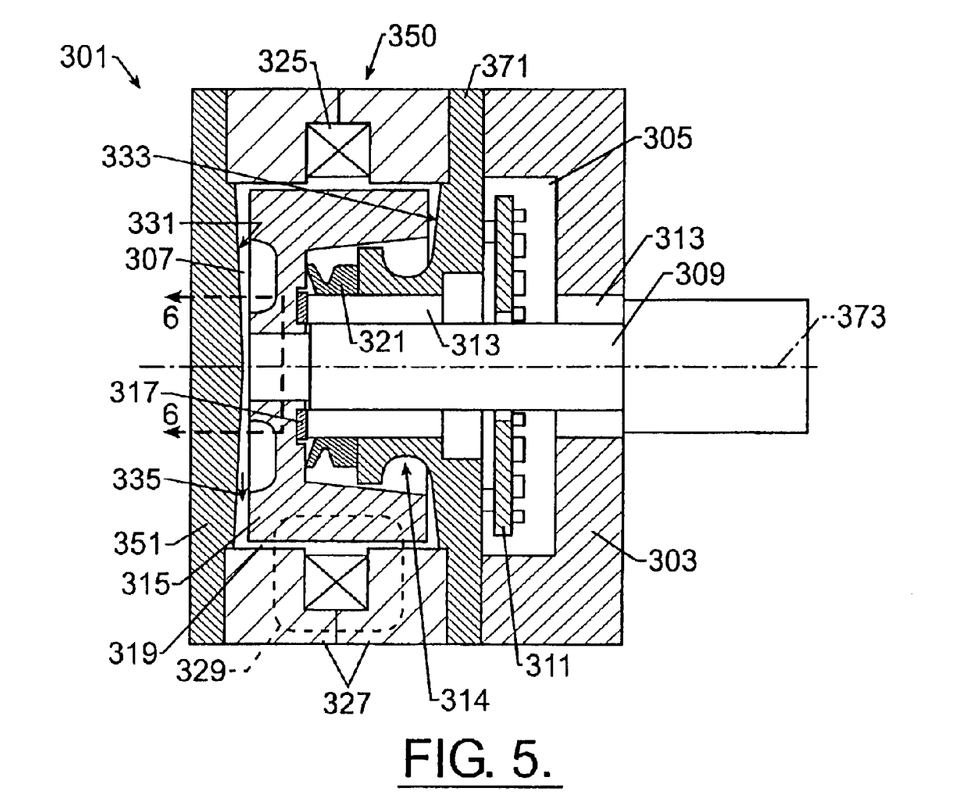
FIG. 5 is a longitudinal sectional view illustrating an alternative construction of the brake of FIG. 3 showing tapered walls to enhance migration of controllable material away from the shaft, and also showing alternative seal and bearing construction.

A fifth embodiment brake 301 is disclosed in FIG. 5 and the fifth embodiment brake is similar to the embodiment of FIG. 3.

The fifth embodiment brake comprises a housing 303 having a chamber 305 for housing control means such as integrated control electronics or control devices and such is identified schematically at 311. Shaft 309 extends through second chamber 305 and into a first chamber 307 and the rotor 315 is supported on the shaft end in the first chamber 307. The chamber 307 is closed and sealed at the axial ends by plates 351 and 371. In the fifth embodiment of the invention the rotor 315, is a "drum-style" rotor similar to the rotor illustrated in the third embodiment of FIG. 3. The rotor comprises a wide annular outer periphery joined by a relatively narrow web. The shaft 309 is supported for rotation away from the rotor by two bearings 313, which for purposes of the present invention are conventional "dry shaft" bearings which are a suitable alternative to the roller bearings illustrated in the previous embodiments. In this fifth embodiment of the invention, the shaft 309 is suitably supported to sustain axial loading and to prevent axial movement of the loaded shaft. A conventional thrust bearing thrust bearing 317 of conventional construction is provided along shaft 309 between rotor 315 and bearing 313 to support the axial shaft loads.

The magnetic field generator 350 is located radially outwardly from the outer periphery of the rotor 315. The field generator comprises annular pole pieces 327 that enclose an electromagnetic coil 325 which in combination with field responsive material 319 and rotor periphery produce an electromagnetic flux represented by flux lines 329 represented as dashed in FIG. 5. As shown in FIG. 5 the field responsive material is located in the annular gap separating the outer periphery of the rotor and the field generator.

In the fifth embodiment brake 301, the plates 351 and 371 that close the axial ends of chamber 307 comprises tapered inner walls 331 and 333 respectively. As shown in FIG. 5, the walls generally taper outwardly from the axis of rotation 373. In this way, the chamber narrows progressively as the distance from the axis decreases and, conversely, the chamber widens progressively as the distance from the axis increases. The maximum axial dimension of the chamber occurs proximate the rotor outer periphery and field generator 350. As a result of the foregoing chamber taper, the shear rate of the field responsive material can be made substantially constant or increase as the distance from the axis increases and the axial chamber dimension decreases such that migration of controllable material 319 is promoted in the direction of arrow 335 away from seals 321. The seal 321 in this embodiment can take the shape of v-seals which provide a material-free region between an extension of the seal 321 which slides against the surface of rotor 315 as it rotates, preventing material from contacting the bearing 313, in this case dry shaft bearing 313. Other face seal and lip seal configurations can be used in this region. Similarly, a well structure 314 as shown, creates a tortuous path tending to keep the material away from the seals 321.

Figure 6:
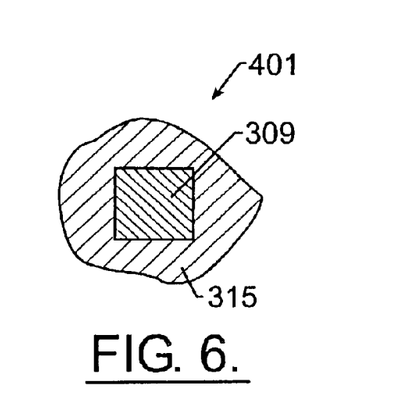
FIG. 6 is a cross-sectional view along line 6—6 of FIG. 5 illustrating how a connection between a rotor and a shaft may be made and how backlash between the rotor and the shaft may be allowed and implemented.

FIG. 6 illustrates in cross-sectional view along lines 6—6 of FIG. 5 and represents one arrangement for connecting the shaft 309 and rotor 315. As shown in FIG. 6, shaft 309 is shaped as a rectangle at the region of the rotor 315 to fit within a mating square-shaped aperture within the rotor. It is possible in such a configuration to allow for relative slippage or backlash between the shaft 309 and the rotor 315. In some cases it may be desirable to allow for such slippage or backlash. For example, when the device with which the brake is associated has reached its end-of-motion point and the electromagnetic field is at full strength, such slippage or backlash may be desirable to allow a relatively small movement of the shaft 309 without movement of the rotor being detected by a sensor of the control means which would trigger a reduction of the electromagnetic field thereby allowing an operator to move the device associated with the brake away from the end-of-motion position. In this way the device could be displaced away from the end of motion position without first having to overcome the strong material shear stress associated with being at the end of travel location. While a square arrangement is shown, it will be appreciated that other configurations, such as a grooved circular cross section such as a splined shaft and grooved engagement surfaces on the rotor, slightly mismatched in dimension, can provide a similar function, as well as other arrangements as will be readily apparent to those of ordinary skill in the art.

As will also be readily apparent to those of ordinary skill in the art, the various features of the various embodiments can be interchanged as may be appropriate for the particular configuration, by providing a brake in which the rotor is supported by a shaft on one side only and having two bearings to support the shaft, in all cases a cavity can be created in which, in one housing can be housed various sensors, control means electronics and other items that the system may require in an integrated package.

Thus, there has been shown and described an improved brake with field controllable material. It will be apparent to those skilled in the art, however, that many changes, variations, modifications, and other uses and applications for the subject device are possible, and all such changes, variations, modifications, and other uses and applications which do not depart from the spirit and scope of the invention are deemed to be covered by the invention which is limited only by the claims which follow.

What is claimed is:

1. A controllable brake comprising:
   (a) a housing comprising a first chamber and a second chamber;
   (b) a shaft comprising a first shaft end, the shaft extending through the first and second housing chambers;
   (c) a rotor made integral with the shaft substantially at the first shaft end, the rotor having an outer periphery, said rotor being located in the first housing chamber;
   (d) field generating means located in the first housing chamber proximate the outer periphery of the rotor;
   (e) field responsive material located in said first chamber, the rheology of said material being affected by said field generating means; and
   (f) means for controlling and/or monitoring the operation of the brake, said means located in said second chamber.

* * * * *